(12) United States Patent
Ohara

(10) Patent No.: US 7,130,086 B2
(45) Date of Patent: Oct. 31, 2006

(54) IMAGE PROCESSING APPARATUS AND METHOD WITH FORGERY AND/OR FRAUD CONTROL

(75) Inventor: Eiji Ohara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 978 days.

(21) Appl. No.: 09/768,329

(22) Filed: Jan. 25, 2001

(65) Prior Publication Data

US 2002/0051237 A1    May 2, 2002

(30) Foreign Application Priority Data

Jan. 31, 2000    (JP) .............................. 2000-022963

(51) Int. Cl.
*H04N 1/40*    (2006.01)
(52) U.S. Cl. ...................................... 358/3.28; 358/2.1
(58) Field of Classification Search ................. 358/1.8, 358/468, 3.28, 1.9, 2.1; 382/100, 232
See application file for complete search history.

(56) References Cited

U.S. PATENT DOCUMENTS

| | | | |
|---|---|---|---|
| 5,216,724 A * | 6/1993 | Suzuki et al. ................ | 382/135 |
| 5,765,089 A * | 6/1998 | Hasuo et al. ................ | 399/366 |
| 5,909,602 A * | 6/1999 | Nakai et al. .................... | 399/8 |
| 5,949,555 A | 9/1999 | Sakai et al. | |
| 6,674,444 B1 * | 1/2004 | Tahara ......................... | 345/589 |
| 6,731,784 B1 * | 5/2004 | Yang ........................... | 382/135 |

FOREIGN PATENT DOCUMENTS

| | | |
|---|---|---|
| JP | 07-249120 | 9/1995 |
| JP | 07-271981 | 10/1995 |
| JP | 10-187968 | 7/1998 |

* cited by examiner

*Primary Examiner*—Thomas D. Lee
*Assistant Examiner*—Stephen Brinich
(74) *Attorney, Agent, or Firm*—Fitzpatrick, Cella, Harper & Scinto

(57) ABSTRACT

There are provided an image processing apparatus and method which can reliably and quickly prevent forgery. To accomplish this, an image processing apparatus includes a discrimination circuit (111) for discriminating using a plurality of different discrimination processes whether or not image data is a specific image, and a control circuit (112) for controlling the process of the image data in accordance with the discrimination result of the discrimination circuit. The discrimination circuit (111) has a digital watermark detection unit (111a) for discriminating whether or not specific digital watermark information is embedded in image data, and a feature extraction unit (112a) for discriminating similarity between the feature obtained from the image data, and that of a specific image which is set in advance. The presence/absence of execution of operations and execution order of the digital watermark detection unit and feature extraction unit are set.

7 Claims, 8 Drawing Sheets

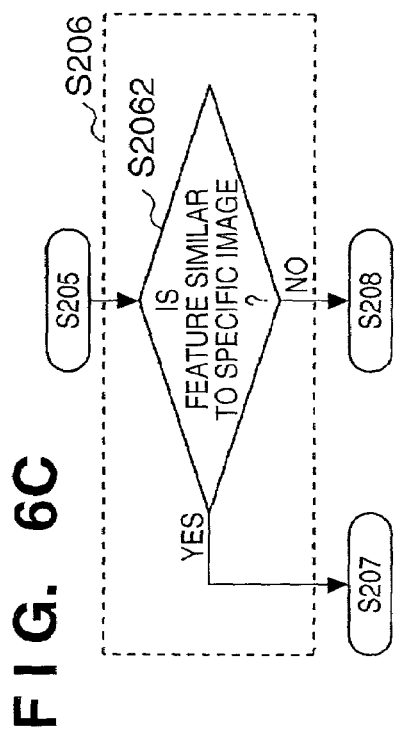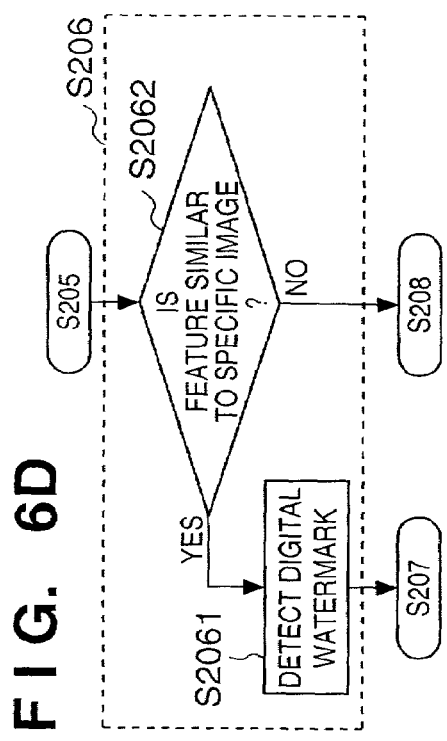
FIG. 6C
FIG. 6D
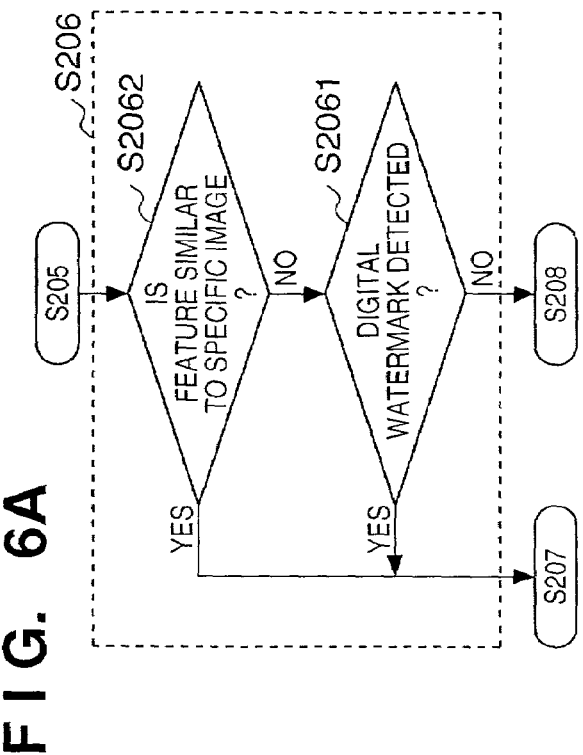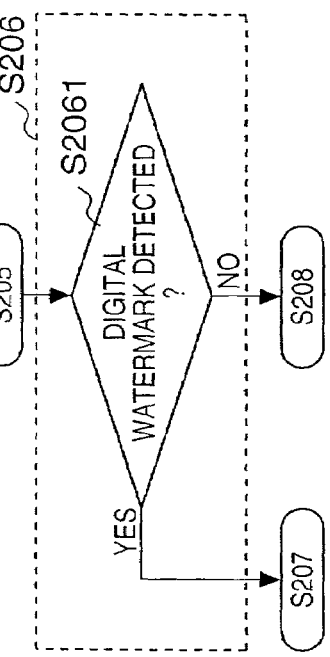
FIG. 6A
FIG. 6B

IMAGE PROCESSING APPARATUS AND METHOD WITH FORGERY AND/OR FRAUD CONTROL

FIELD OF THE INVENTION

The present invention relates to an image processing apparatus and method.

BACKGROUND OF THE INVENTION

In recent years, with the advent of color copying machines with higher image quality, documents such as securities, bank notes, and the like, which should not be illicitly copied, may be forged.

Various kinds of documents, which should not be illicitly copied are present, must be accurately discriminated without any errors. Furthermore, the copying speed for normal documents must be prevented from being considerably reduced due to discrimination function of such specific documents.

SUMMARY OF THE INVENTION

It is, therefore, an object of the present invention to provide an image processing apparatus and method, which can reliably and quickly prevent forgery.

In order to achieve the above object, an image processing apparatus comprising:

an input unit for inputting image data;

first discrimination means for discriminating whether or not specific digital watermark information is embedded in the image data inputted by the input unit;

second discrimination means for discriminating similarity between a feature obtained from the image data inputted by the input unit, and a feature of a specific image;

setting means for setting the presence/absence of execution and an execution order of the first and second discrimination means; and control means for controlling operations of the first and second discrimination means in accordance with a setting state of the setting means and controlling a process of the image data on the basis of the discrimination results of the first and second discrimination means.

When the first discrimination means determines that the specific digital watermark information is embedded in the image data or when the second discrimination means determines that the similarity between the features of the image data and specific image data is high, the control means prevents faithful reproduction of the image data.

The apparatus may further comprise storage means for storing the image data inputted by the input unit, and wherein the first and second discrimination means discriminate the image data stored in the storage means.

In order to achieve the above object, another image processing apparatus according to the present invention comprises:

discrimination means for discriminating using a plurality of different discrimination processes whether or not image data is a specific image; and control means for controlling a process of the image data in accordance with a discrimination result of the discrimination means, wherein the discrimination means executes at least a discrimination process for discriminating whether or not specific digital watermark information is embedded in the image data.

The discrimination means executes at least a discrimination process for discriminating similarity between a feature obtained from the image data, and a feature of a specific image which is set in advance.

An arbitrary discrimination process of the plurality of different discrimination processes executed by the discrimination means can be selected.

An order of the plurality of different discrimination processes executed by the discrimination means can be set.

When it is determined in at least one of the plurality of different discrimination processes that an input image is a specific image, the discrimination means aborts other discrimination processes.

Only when it is determined in a first discrimination process of the plurality of different discrimination processes that an input image is a specific image, the discrimination means executes a second discrimination process.

When image data inputted by input means is a specific image, the control means executes one of control for inhibiting the image data from being stored in storage means, control for modifying the image data and storing the modified image data in the storage means, control for erasing the image data temporarily stored in the storage means, and control for modifying the image data temporarily stored in the storage means and re-storing the modified image data in the storage means.

An image processing method according to the present invention comprises:

the discrimination step of discriminating using a plurality of different discrimination processes whether or not image data is a specific image; and the control step of controlling a process of the image data in accordance with a discrimination result of the discrimination step, wherein the discrimination step includes the step of executing at least a discrimination process for discriminating whether or not specific digital watermark information is embedded in the image data.

A computer readable memory according to the present invention is a computer readable memory that stores an image processing program which can process a specific image, the image processing program including:

a program code of the discrimination step of discriminating using a plurality of different discrimination processes whether or not image data is a specific image; and a program code of the control step of controlling a process of the image data in accordance with a discrimination result of the discrimination step, wherein the program code of the discrimination step includes at least a discrimination process program code for discriminating whether or not specific digital watermark information is embedded in the image data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 6A to 6D are flow charts showing another discrimination process sequence;

DETAILED DESCRIPTION OF THE PREFERRED EMBODIMENTS

Preferred embodiments of the present invention will be explained in detail hereinafter with reference to the accompanying drawings. Note that a relative layout, equations, numerical values, and the like described in this embodiment do not limit the scope of this invention unless otherwise specified. A "specific image" indicates an image such as securities, bank notes, and the like which should not be copied for malevolent purposes.

First Embodiment

Figure 1:
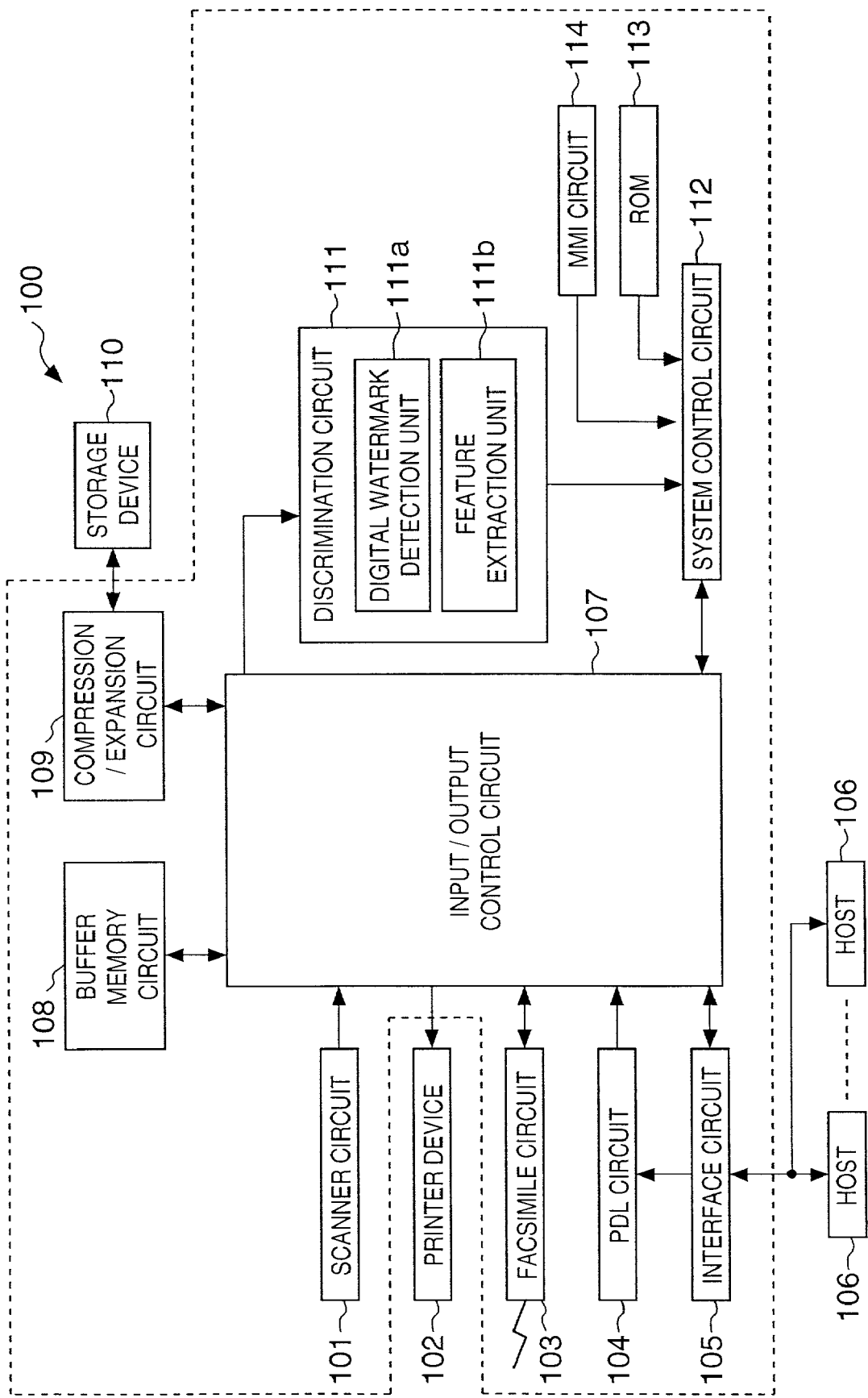
FIG. 1 is a block diagram showing the arrangement of an image input/output processing apparatus according to the first embodiment of the present invention.

FIG. 1 is a schematic block diagram showing the arrangement of an image input/output processing apparatus 100 according to the first embodiment of the present invention.

[Apparatus Arrangement]

The image input/output processing apparatus comprises a scanner circuit 101 for reading an image on a document, a PDL circuit 104 for interpreting PDL (Page Description Language) data, an input/output control circuit 107 which receives the outputs from the scanner circuit 101 and PDL circuit 104, a facsimile circuit 103 connected to a public network, an interface circuit 105 for exchanging data with host computers (to be simply referred to as hosts hereinafter) 106, a buffer memory circuit 108 for temporarily storing image data, a compression/expansion circuit 109 for compressing/expanding image data, and a discrimination circuit 111 for discriminating the type of read image data, as shown in FIG. 1.

A printer device 102 is connected to the input/output control circuit 107, and a storage device 110 is connected to the compression/expansion circuit 109.

The image input/output processing apparatus 100 also comprises an MMI (man-machine interface) circuit 114, a ROM 113, and a system control circuit 112 which receives the outputs from the discrimination circuit 111, MMI circuit 114, and ROM 113. The output from the system control circuit 112 is supplied to the input/output control circuit 107.

The image input/output processing apparatus 100 receives image data read by the scanner circuit 101, image data received by the facsimile circuit 103, or image data obtained by the PDL circuit 104.

The scanner circuit 101 supplies image data read by scanning a document to the input/output control circuit 107. The facsimile circuit 103 can send/receive image data, and supplies received image data to the input/output control circuit 107. The PDL circuit 104 rasterizes PDL data, which is generated by each host 106 and is transferred via the interface circuit 105, to obtain a bitmap image. The interface circuit 105 supplies PDL data to the PDL circuit 104, exchanges data with the input/output control circuit 107, and makes two-way image data communications with the hosts 106.

The input/output control circuit 107 controls read/write of image data with respect to the buffer memory circuit 108, read/write of image data with respect to the storage device 110 via the compression/expansion circuit 109, and the like, thus storing image data supplied from the scanner circuit 101, facsimile circuit 103, or PDL circuit 104 in the buffer memory circuit 108, and saving it in the storage device 110 comprising an MO (magnetooptical disk) drive, hard disk, or the like, via the compression/expansion circuit 109. Also, the input/output control circuit 107 supplies the received data to the discrimination circuit 111.

The discrimination circuit 111 includes a digital watermark detection unit 111$a$ and feature extraction unit 111$b$, discriminates if image data received from the input/output control circuit 107 is a specific image, and supplies the discrimination result to the system control circuit 112.

The system control circuit 112 comprises a CPU and the like, and controls the operations of the overall image input/output processing apparatus 100 in accordance with various setups which are made at the MMI circuit 114 such as a control panel and pertain to the image input/output processing apparatus 100, and a processing program pre-stored in the ROM 113. Especially, the system control circuit 112 controls the operation of the input/output control circuit 107 in accordance with the discrimination result of the discrimination circuit 111.

Therefore, the input/output control circuit 107 supplies image data saved in the storage device 110 to the printer device 102, which prints out image data, via the compression/expansion circuit 109 under the control of the system control circuit 112.

The printer device 102 prints out image data from the input/output control circuit 107.

[Copying Process]

Figure 2:
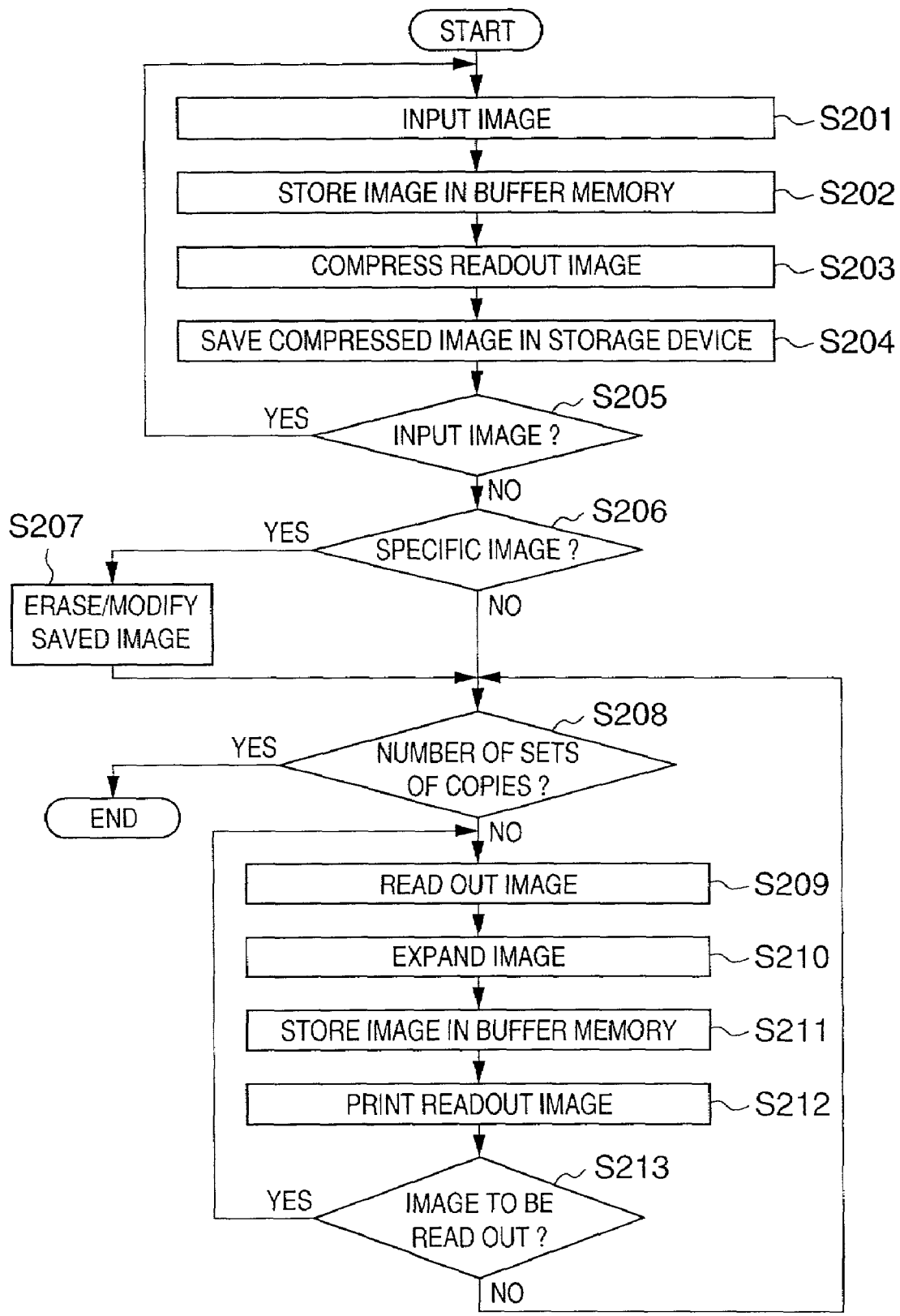
FIG. 2 is a flow chart for explaining the processing program executed by the image input/output processing apparatus.

The copying process of the system control circuit 112 will be described below with reference to FIG. 2. FIG. 2 is a flow chart showing the copying process sequence.

A control program for implementing the process shown in FIG. 2 is pre-stored in the ROM 113, and is read out and executed by the system control circuit 112. Note that this control program implements a copying function, which is one of the functions of the image input/output processing apparatus 100.

When the system control circuit 112 reads out and executes the control program stored in the ROM 113, an image read instruction is issued to, e.g., the scanner circuit 101 via the input/output control circuit 107 in step S201. In response to this instruction, the scanner circuit 101 reads an image on a document (not shown) as digital image data (to be referred to as image data hereinafter). The flow then advances to step S202, in which the image data is inputted to the input/output control circuit 107, and is stored in the buffer memory circuit 108 under the control of the input/output control circuit 107.

The system control circuit 112 supplies an instruction to the input/output control circuit 107 to save the image data stored in the buffer memory circuit 108 in the storage device 110. In response to this instruction, the input/output control circuit 107 reads out image data from the buffer memory circuit 108, and supplies it to the compression/expansion circuit 109. The compression/expansion circuit 109 compresses the image data supplied from the input/output control circuit 107 by a predetermined compression scheme (step S203), and saves the compressed data in the storage device 110 (step S204).

The system control circuit 112 checks via the input/output control circuit 107 if the next document is present on the scanner circuit 101 (step S205). For example, if an automatic document feeder (not shown) is connected to the scanner circuit 101, and conveys a plurality of documents to read images on these documents, the system control circuit 112 checks based on the output from a document sensor of that automatic document feeder if the next document is present. If the next document is preset, the system control circuit 112 controls the operation to repeat the aforementioned processes in step S201 and the subsequent steps. At this time, a plurality of image data are saved in the storage device 110, and the system control circuit 112 manages the addresses of the saved image data.

After all document images are read by the scanner circuit 101 and are stored in the storage device 110, the system control circuit 112 supplies an instruction to the input/output control circuit 107 to read out image data saved in the storage device 110 and supply it to the discrimination circuit 111. Upon receiving the instruction, the input/output control circuit 107 controls read of the storage device 110 to supply one of image data saved in the storage device 110 to the compression/expansion circuit 109 in accordance with the saving order. The compression/expansion circuit 109 expands the image data from the storage device 110 by a predetermined expansion scheme. The image data expanded by the compression/expansion circuit 109 is supplied to the discrimination circuit 111 under the control of the input/output control circuit 107.

Figure 3:
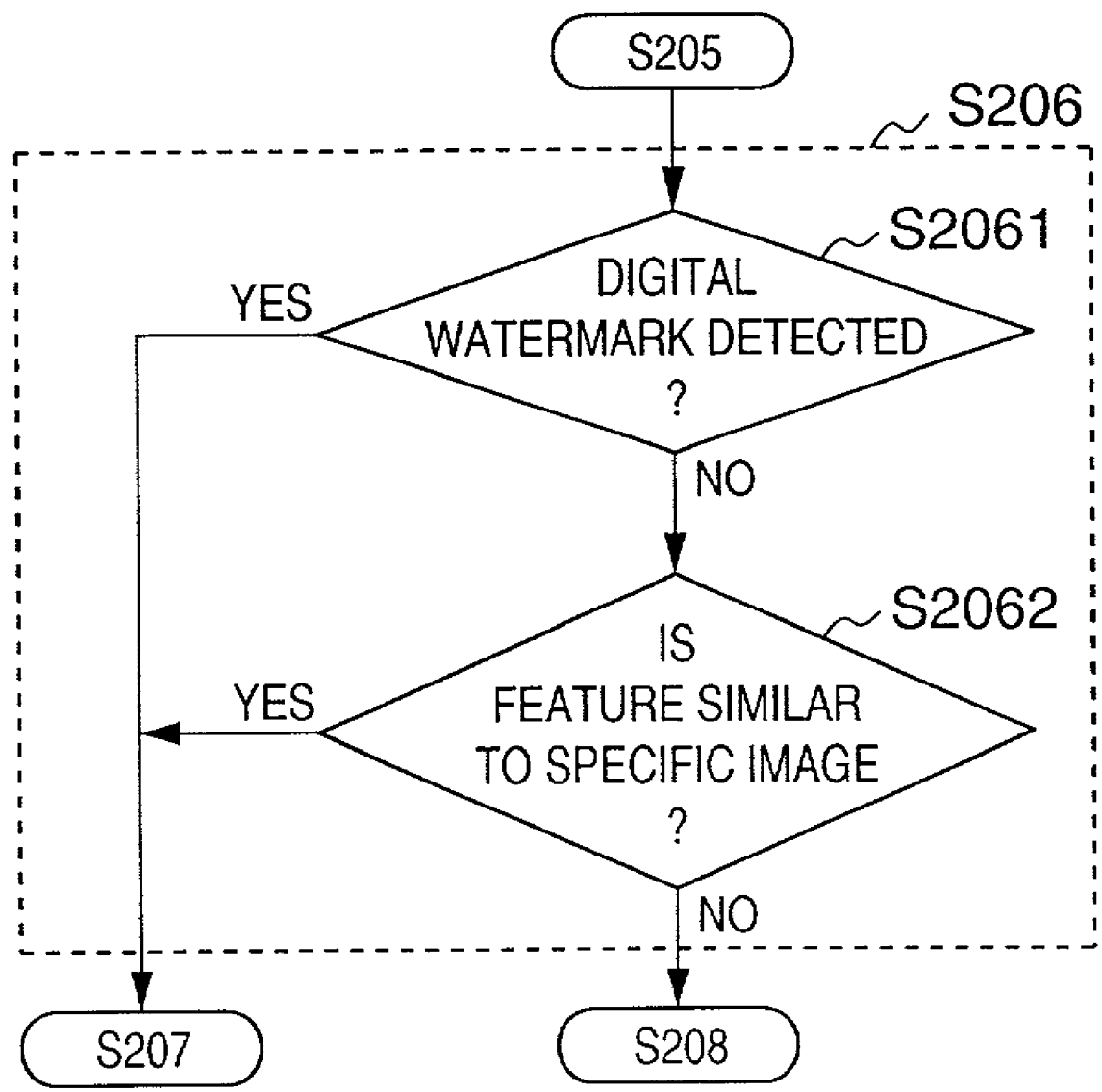
FIG. 3 is a flow chart showing details of the discrimination process sequence of the image input/output processing apparatus.

The discrimination circuit 111 checks in step S206 if the image data is a specific image. FIG. 3 is a flow chart showing details of the contents of step S206. When the image data is supplied to the discrimination circuit 111, the digital watermark detection unit 111a checks in step S2061 if specific digital watermark information is embedded in advance in the image data. If it is determined that no digital watermark information is embedded in the image data, the flow advances to step S2062. In step S2062, the feature extraction unit 111b checks if the image data is a specific image, on the basis of similarity obtained by extracting a feature of the image data, and comparing the extracted feature data with that of a specific image which is held in advance. The discrimination result of the discrimination circuit 111 is supplied to the system control circuit 112, and the flow advances to step S207.

When it is determined based on the discrimination result of the discrimination circuit 111 that the image data is a specific image, the system control circuit 112 supplies an instruction to the input/output control circuit 107 to erase the image data from the storage device 110 or to modify the image data and re-store the processed image data in the storage device 110. In this manner, the input/output control circuit 107 erases the image data that matches the specific image from the storage device 110, or modifies it.

In the modification process, for example, the compression/expansion circuit 109 expands image data read out from the storage device 110, the input/output control circuit 112 appends a specific pattern which is held in advance to the expanded image data, and the compression/expansion circuit 109 compresses that data again and saves it in the storage device 110. The discrimination process in step S206 and the process in step S207 in accordance with the discrimination result of that step are executed for all image data saved in the storage device 110.

The system control circuit 112 then detects a copy set count to be printed set at, e.g., the MMI circuit 114, and checks if the printer device 102 has completed printouts corresponding to the set copy set count to be printed (step S208).

If it is determined in step S208 that the printer device 102 has not completed up to the last copy set count, the system control circuit 112 supplies an instruction to the input/output control circuit 107 to read out image data saved in the storage device 110. In response to this instruction, the input/output control circuit 107 controls read of the storage device 110 to supply one of image data saved in the storage device 110 in accordance with the saving order to the compression/expansion circuit 109 (step S209). The compression/expansion circuit 109 expands the image data from the storage device 110 by the predetermined expansion scheme (step S210).

The input/output control circuit 107 stores the image data expanded by the compression/expansion circuit 109 in step S210 in the buffer memory circuit 108 (step S211)

The system control circuit 112 supplies an instruction to the input/output control circuit 107 to print out the image data by the printer apparatus 102. In response to this instruction, the input/output control circuit 107 reads out the image data stored in the buffer memory circuit 108 in step S211 and supplies it to the printer device 102, which prints out the image data supplied from the input/output control circuit 107 (step S212).

The system control circuit 112 checks via the input/output control circuit 107 if all image data saved in the storage device 110 have been read out and printed out (step S213).

If it is determined in step S213 that all image data have not been printed out yet, the system control circuit 112 controls the operation to repeat the aforementioned processes in step S209 and the subsequent steps.

As a result, all image data saved in the storage device 110 are read out in the order they were saved, and are printed out by the printer device 102.

Upon completion of printouts of all image data saved in the storage device 110, the system control circuit 112 recognizes this fact based on the discrimination result in step S213, and the flow returns to the discrimination process in step S208 to check if the print process is complete up to the last copy set count. If it is determined in step S208 that the print process is complete up to the last copy set count, the system control circuit 112 ends this process; otherwise, the circuit 112 controls the operation to repeat the aforementioned processes in step S209 and subsequent steps.

Therefore, when only one set of copies are to be printed out, the processes in steps S209 to S212 are repeated in correspondence with the number of image data saved in the storage device 110, thus reading out the image data from the storage device 110 in the saving order, and printing them out from the printer device 102. At this time, since image data which is determined to be a specific image is not saved in the storage device 110, it is not printed out by the printer device 102, or a modified image is printed out.

In the above description, image data read by the scanner circuit 101 is inputted to the input/output control circuit 107. Alternatively, image data obtained by the PDL circuit 104 may be inputted to the input/output control circuit 107. In this case, image data generated by each host 106 is transferred to the PDL circuit 104 via the interface circuit 105 under versatile protocol control such as SCSI (Small Computer System Interface), TCP (Transmission Control Protocol)/IP (Internet Protocol), or the like. The system control circuit 112 issues a PDL rasterize instruction to the PDL circuit 104 via the input/output control circuit 107. In response to this instruction, the PDL circuit 104 rasterizes image data (PDL data: data described in PDL) transferred from the host 106 to bitmap data.

The image data (rasterized image) rasterized to bitmap data by the PDL circuit 104 is inputted to the input/output control circuit 107, and is stored in the buffer memory circuit 108 under the control of the input/output control circuit 107.

Also, image data (facsimile image data) received by the facsimile circuit 103 may be inputted to the input/output control circuit 107. In this case, operation is made while replacing image data which is rasterized to bitmap data by the PDL circuit 104 by facsimile image data received by the facsimile circuit 103.

[Discrimination Process]

The discrimination process (step S206) executed by the discrimination circuit 111 will be described in detail below.

As described above, the discrimination circuit 111 includes the digital watermark detection unit 111a and feature extraction circuit 111b, and can execute two different discrimination processes. These discrimination processes will be explained in turn below.

<Discrimination Process Using Digital Watermark>

Figure 4:
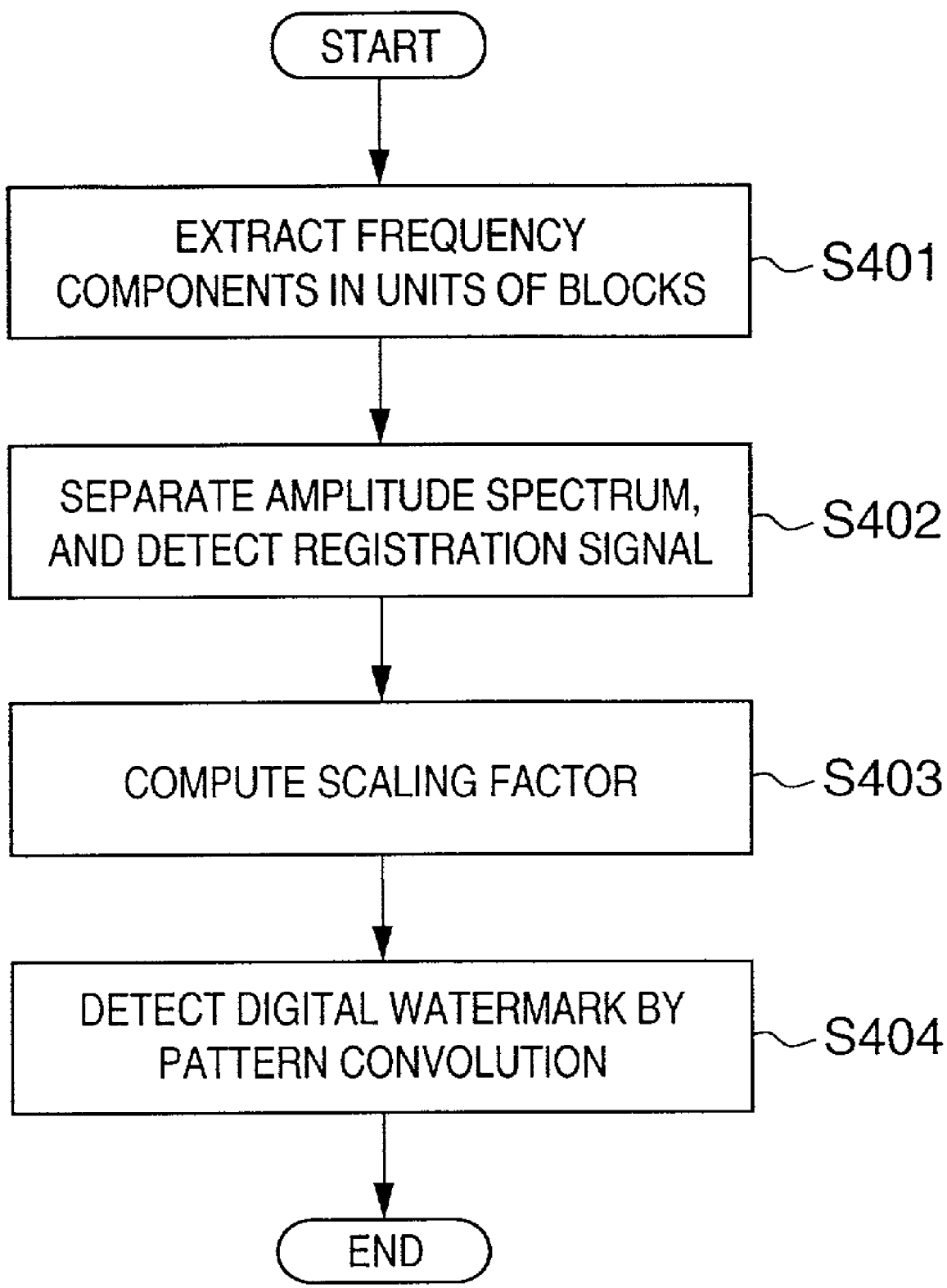
FIG. 4 is a flow chart for explaining discrimination of a specific image using a digital watermark.

A process for checking if image data is a specific image by detecting a digital watermark by the digital watermark detection unit 111a will be explained as the first discrimination process using FIG. 4.

In step S401, an input image is broken up into a plurality of blocks, and Fourier transforms are computed in units of blocks to extract frequency components.

The image of the frequency domain obtained in step S401 is separated into amplitude and phase spectra, and a registration signal contained in the amplitude spectrum is detected in step S402.

In general, a signal embedded in low-frequency components tends to be recognized as noise compared to that embedded in high-frequency components owing to visual characteristics of a human being. On the other hand, a signal embedded in high-frequency components is often removed by a low-pass filter effect of an irreversible compression scheme such as JPEG.

In consideration of these shortcomings, the registration signal is embedded as an impulse signal to a frequency of an intermediate level which is equal to or higher than the first frequency level that is hard to visually recognize by a human being and is equal to or lower than the second frequency level at which no signal is removed by irreversible compression/expansion.

Upon detecting the registration signal, an impulse signal in the frequency domain of intermediate level contained in the amplitude spectrum is extracted.

The scaling factor of an input image is computed from the coordinates of the extraction position of the extracted impulse signal. The discrimination circuit 111 that detects a digital watermark recognizes in advance a frequency component, in which an impulse signal is embedded, of an image to be discriminated, which has not undergone scaling.

In step S403, the scaling factor is computed based on the ratio between the frequency recognized in advance and the frequency of the detected impulse signal. If a represents the frequency which is recognized in advance and b represents the frequency of the detected impulse signal, scaling at a/b is done. This is a known nature of Fourier transformation.

In step S404, the size of a pattern used to detect a digital watermark embedded in the input image is determined based on the scaling factor, and the digital watermark embedded in the input image is detected by convolution using the pattern.

Note that a digital watermark may be appended to any color component image that forms an input image. In this embodiment, a digital watermark is appended to a blue component to which a human being is least sensitive, and pattern detection in this case is done using the blue component.

When a digital watermark is embedded in a specific frequency component which is not a visible color component, it may be detected from a specific frequency after the Fourier transforms of the input image are computed.

<Discrimination Process Using Feature Extraction>

The second discrimination process will be explained below. For example, when an input image read by the scanner circuit 101 is color image data, the discrimination circuit 111 compares that input image and a specific image in units of pixels in a common color space.

Figure 5:
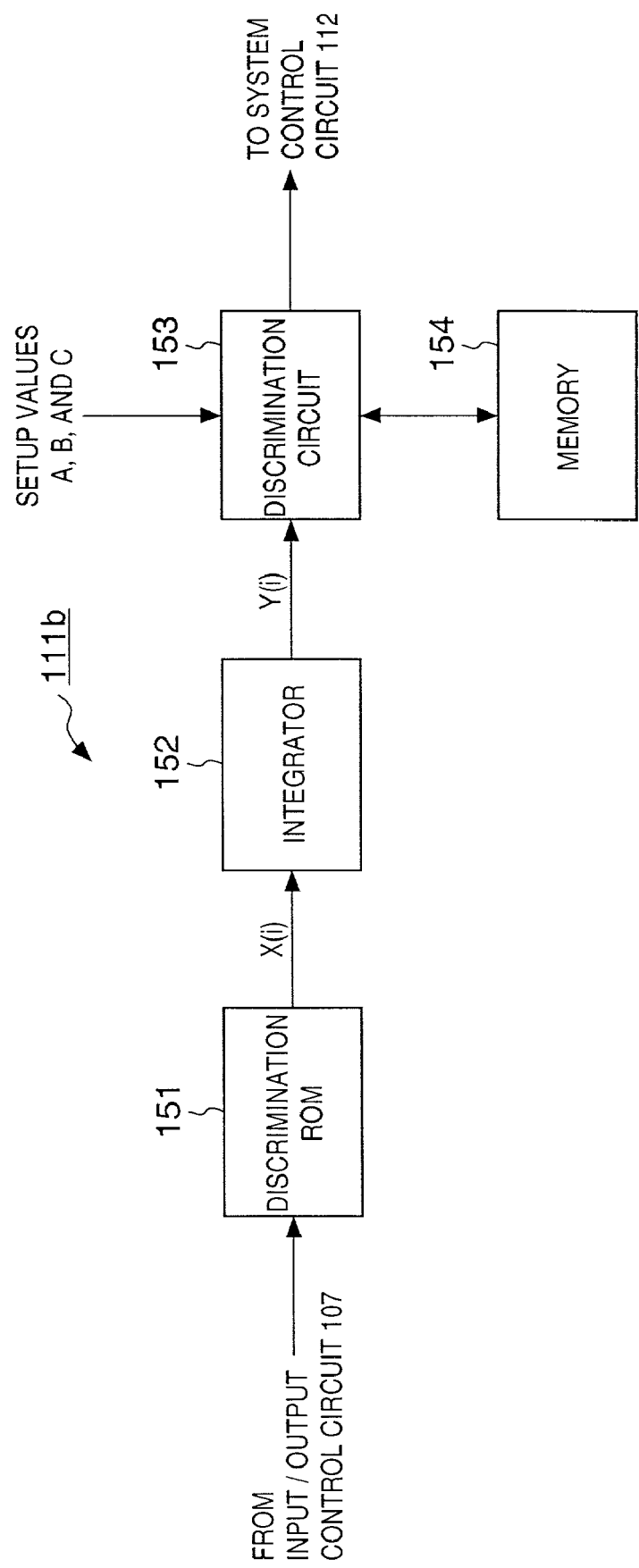
FIG. 5 is a block diagram for explaining the arrangement of a feature extraction type specific image discrimination circuit.

The discrimination circuit 111 comprises a discrimination ROM 151 which receives image data from the input/output control circuit 107 (FIG. 1), an integrator 152 which receives the output from the discrimination ROM 151, a discrimination circuit 153 which receives the output from the integrator 152, and a memory 154 which is accessed by the discrimination circuit 153, as shown in FIG. 5, and the output from the discrimination circuit 153 is supplied to the system control circuit 112 (FIG. 1).

The discrimination ROM 151 receives image data from the input/output control circuit 107, reads out data X(i), and supplies it to the integrator 152. At this time, the discrimination ROM 151 inputs as data X(i) to the integrator 152 a numerical value "1" when color space data of an input image is included in that of a specific image or "0" when it is not included.

Using X(i) from the discrimination ROM 151, the integrator 152 computes:

$$Y(i)=AY(i-1)+256(1-A)X(i)$$

$$i=1, 2, 3, \ldots, 0<A<1$$

and supplies an integrated value Y(i) to the discrimination circuit 153.

The discrimination circuit 153 obtains the number of pixels for which an integrated value Y(i) output from the integrator 152 is equal to or larger than a pre-set numerical value (setup value A). In this manner, the number of pixels of a region which is likely to be the specific image in the input image is computed.

The reason why the integrated value Y(i) is used is to remove isolated pixels by integration since pixels successively appear to some extent when the input image is actually included in color space data of the specific image.

When the number of pixels computed in this way is equal to or larger than a pre-set numerical value (setup value B), the discrimination circuit 153 recognizes that the input image includes a given region of the color space of the specific image and is highly likely to be the specific image, and then executes a discrimination process of the similarity.

In this case, the discrimination circuit 153 uses an arbitrary color of the color space in correspondence with the address of the memory 154, stores "1" at an address on the memory 154, which corresponds to the color of a pixel equal to or larger than the setup value A, and repeats this process for all pixels of the input image.

The discrimination circuit 153 counts the number of pixels stored as "1" on the memory 154. When the count value is equal to or larger than a pre-set value (setup value C), the discrimination circuit 153 determines that the input image is similar to the specific image, and supplies the discrimination result to the system control circuit 112.

In this way, since the discrimination circuit 153 discriminates the similarity, whether or not the color space of the specific image is included can be discriminated over a broad range while preventing the count value of the integrated value Y(i) as the output from the integrator 152 from including the count of an identical color counted a plurality of times.

[Other Operations of Discrimination Circuit]

Other operations of the discrimination circuit 111 will be described below. FIGS. 6A to 6D are flow charts showing processes executed by the discrimination circuit 111.

In FIG. 3, the first discrimination process (step S2061) is executed, and only when the input image is not a specific image, the second discrimination process (step S2062) is executed. However, the operation executed by the discrimination circuit 111 is not limited to such specific processes, and operations shown in FIGS. 6A to 6D may be executed.

In FIG. 6A, the second discrimination process (step S2062) is executed first, and only when the input image is not a specific image, the first discrimination process (step S2061) is executed. In other words, in the process shown in FIGS. 3 and 6A, if it is determined by one discrimination process that the input image is a specific image, the other discrimination process is skipped.

When the input/output processing apparatus 100 implements a copying function, since its object is to inhibit a specific image from being copied, whether or not the input image is a specific image need only be discriminated irrespective of the types of discrimination processes. Hence, it is effective to execute processes in this way.

In FIG. 6B, the discrimination circuit 111 executes the first discrimination process alone. In FIG. 6C, the discrimination circuit 111 executes the second discrimination process alone. This is done to abort one of the discrimination processes when it becomes unnecessary.

That is, This process corresponds to the discrimination circuit 111 when a given specific image loses its significance after it fulfills its role.

In FIG. 6D, the second discrimination process is executed first, and only when an input image is a specific image, the first discrimination process is executed.

For example, when it is determined in the second discrimination process that the input image is a specific image, the first discrimination process is executed to obtain more particular information. That is, this process is effective to detect more particular information such as the copyright, propriety right, and the like by discriminating digital watermark information when the host 106 issues a printout instruction and it is determined that the input image is a specific image.

The supervisor or service person may arbitrarily select these operations of the discrimination circuit 111 at the MMI circuit 114 (FIG. 1). In this case, by setting the presence/absence of each discrimination process or the order of discrimination processes, an arbitrary one of the processing sequences shown in FIG. 3 and FIGS. 6A to 6D can be selected. Information indicating the operation set at the MMI circuit 114 is supplied to the system control circuit 112, which controls the operation of the discrimination circuit Alternatively, the discrimination operation may be set from each host 106. That is, since the host 106 can communicate with the system control circuit 112 connected to the input/output control circuit 107 via the interface circuit 105, which is connected to a LAN or the like, it can set information indicating the operation of the discrimination circuit 111 and can transfer it to the system control circuit 112. Based on this information, the control circuit 112 controls the operation of the discrimination circuit 111 to execute one of the discrimination operations.

Note that these setups should be done by the supervisor who supervises the input/output processing apparatus, and an end user may be inhibited from entering a setup mode unless he or she inputs, e.g., a password.

In FIG. 1, the first and second discrimination processes are implemented by hardware, i.e., the digital watermark detection unit 111a and the feature extraction unit 111b. However, the present invention is not limited to this. For example, the first discrimination process may be implemented by software to analyze details of digital watermark information, and the second discrimination process may be implemented by hardware to assure high performance. Furthermore, both these processes may be implemented by software.

In this embodiment, an input image is temporarily saved in the storage device 110, and when the input image is a specific image, it is erased or modified. Alternatively, it is checked if the input image is a specific image, before it is saved in the storage device 110, and when the input image is a specific image, it may not be saved in the storage device 110 or may be saved after it is modified.

In this embodiment, the order of image data to be printed out by the printer device 102 may be either an order the image data were saved in the storage device 110, or an appropriately replaced order designated by the MMI circuit 114.

The two discrimination processes have been exemplified as those of the discrimination circuit 111. However, the present invention is not limited to such specific processes. For example, discrimination may be made in accordance with other algorithms, and the number of discrimination processes is not limited to two and a plurality of discrimination processes may be done.

As described above, in this embodiment, when it is determined that the input image is a specific image, that image is inhibited from being saved in the storage device 110 or is saved after it is modified, thus reliably preventing forgery.

When the presence/absence of each discrimination process or the order of discrimination processes is allowed to be set, an unnecessary discrimination process can be omitted. Furthermore, when such setup is allowed in units of image supply methods, a discrimination process that matches a given image supply method can be done.

In this embodiment, image data read by the scanner circuit 101 as a copying function is printed out by the printer device 102. However, the present invention is not limited to this, and image data read by the scanner circuit 101 may be transferred to each host 106.

More specifically, as shown in FIG. 2, image data read by the scanner circuit 101 is temporarily saved in the storage device 110, and whether or not the saved image data is a specific image is checked to erase or modify the specific image saved in the storage device 110.

The image data is then read out from the storage device 110, and is expanded by the compression/expansion circuit 109. After that, the input/output control circuit 107 transfers the expanded image data to the host 106 via the interface circuit 105. This operation repeats itself until all image data are transferred.

Hence, only image data which is not a specific image is transferred to the host 106. Alternatively, as for image data which is determined to be a specific image, processed or modified data is transferred. In this way, forgery can be reliably prevented.

Upon transferring image data to the host 106, image data read out from the storage device 110 may be directly transferred without being expanded by the compression/expansion circuit 109. In this case, the host 106 expands the image data. In this way, the time required for transferring data to the host 106 can be shortened. In this embodiment, since read/write of an image with respect to a storage medium is controlled in accordance with the discrimination result as to whether or not an input image is a specific image, when the input image is the specific image, only an input image which is not the specific image, is stored in the storage medium, or a modified image is stored, thus reliably preventing an input image which is the same as a specific image from being output. When images of securities, bank notes, and the like are set as the specific image, even when the same image as the specific image is inputted, that input image is inhibited from being output. Hence, securities, bank notes, and the like can be reliably prevented from being forged. Furthermore, when the presence/absence of each discrimination process or the order of discrimination processes is allowed to be set, an unnecessary discrimination process is omitted, and the discrimination process time can be shortened. When such setups are made in units of image supply methods, discrimination processes that match a given image supply method can be set, thus realizing an image input/output apparatus with high performance.

Second Embodiment

A color copying machine 700 shown in FIG. 7 will be explained below as the second embodiment of an image input/output apparatus according to the present invention. In the first embodiment, the present invention is applied to the image input/output processing apparatus 100 to which external printer and storage devices are connected. On the other hand, in this embodiment, the present invention is applied to the color copying machine 700.

Figure 7:
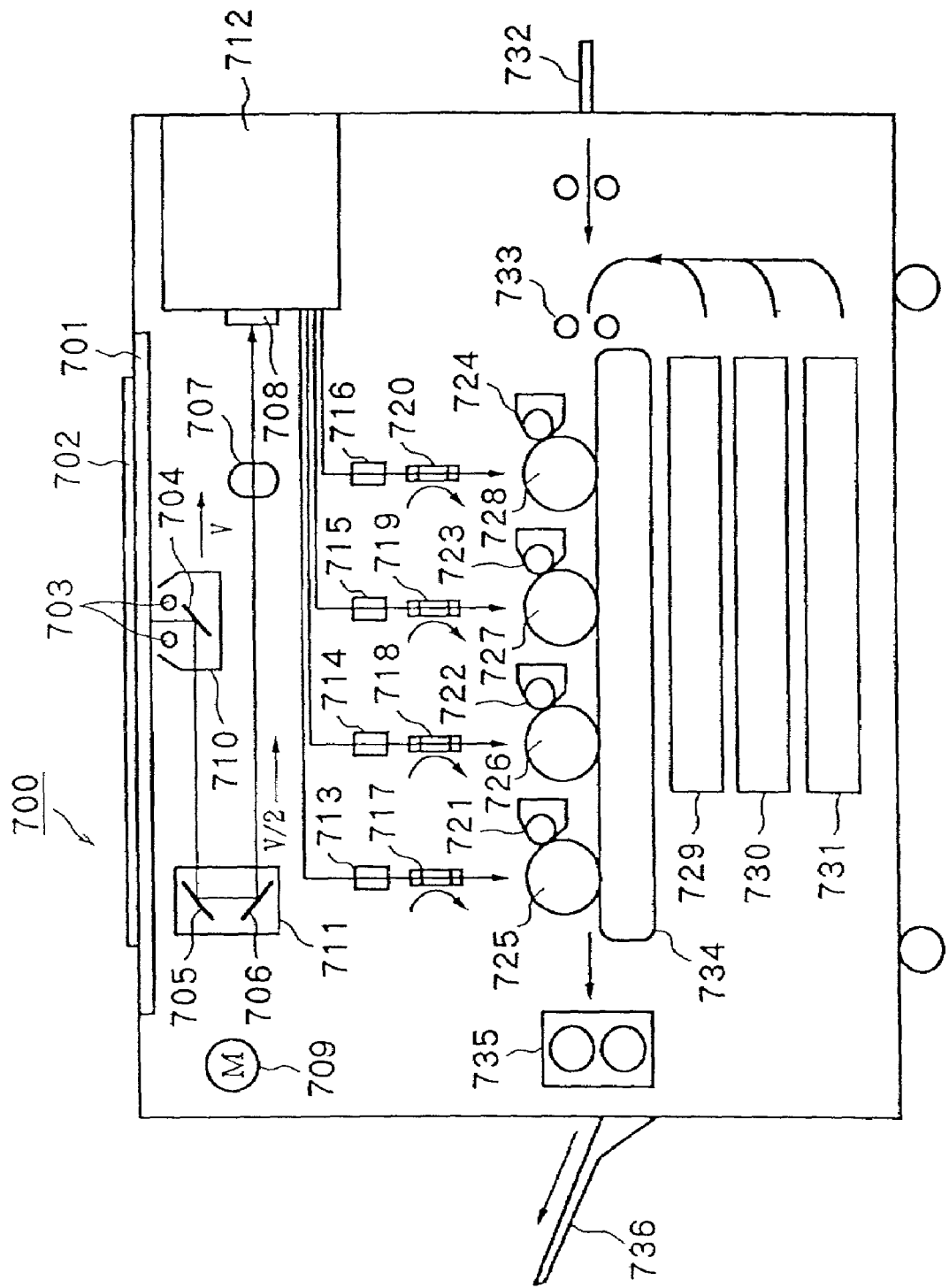
FIG. 7 is a schematic view showing the arrangement of a color copying machine according to the second embodiment of the present invention.

As shown in FIG. 7, this color copying machine 700 comprises a document platen glass 701 on which a document 702 to be read is placed, an illumination 703 for illuminating the document 702 placed on the document platen glass, an optical system 707, mirrors 704 to 706 for guiding light reflected by the document 702 to the optical system 707, an image sensing element 708 on which light coming from the optical system 707 forms an image, a motor 709 for respectively driving a first mirror unit 710 including the mirror 704 and illumination 703, and a second mirror unit 711 including the mirrors 705 and 706, an image processing circuit 712 which receives the output from the image sensing element 708, semiconductor lasers 713 to 716 which receive the output from the image processing circuit 712, polygonal mirrors 717 to 720 which receive the outputs from the corresponding semiconductor lasers 713 to 716, photosensitive drums 725 to 728 which receive the outputs from the corresponding polygonal mirrors 717 to 720, developers 721 to 724 for supplying toners onto the surfaces of the photosensitive drums 725 to 728, paper cassettes 729 to 731, a manual insert tray 732, a transfer belt 734, registration rollers 733 for guiding a paper sheet fed from one of the paper cassettes 729 to 731 and manual tray 732 onto the transfer belt 734, a fixing device 735 for fixing toner images which have been transferred onto the paper sheet on the transfer belt 734 by the photosensitive drums 725 to 728, and an exhaust tray 736 which receives the paper sheet on which the toner images have been fixed by the fixing device 735.

The color copying machine 700 has the functions of the image input/output apparatus 100 shown in FIG. 1. That is, the document platen glass 701, illumination 703, optical system 707, image sensing element 708, first mirror unit 710, second mirror unit 711, motor 709, and the like construct an image reading section, and correspond to the scanner circuit 101 shown in FIG. 1. The image processing circuit 712 is a section for outputting an image signal to be printed, and corresponds to the facsimile circuit 103, PDL circuit 104, interface circuit 105, input/output control circuit 107, buffer memory circuit 108, compression/expansion circuit 109, storage device 110, discrimination circuit 111, system control circuit 112, and the like shown in FIG. 1. Furthermore, the semiconductor lasers 713 to 716, polygonal mirrors 717 to 720, photosensitive drums 725 to 728, paper cassettes 729 to 731, manual insert tray 732, transfer belt 734, registration rollers 733, fixing device 735, and exhaust tray 736 construct a section for printing out an image, and correspond to the printer device 102 shown in FIG. 1.

The operation of the color copying machine 700 will be explained below.

A document 702 to be read is placed on the document platen glass 701. The document 702 is illuminated by the illumination 703, and light reflected by the document 702 forms an image on the image sensing surface of the image sensing element 708 by the optical system 707 via the mirrors 704, 705, and 706 in turn.

At this time, the motor 709 mechanically drives the first mirror unit 710 including the mirror 710 and illumination 703 at velocity V, and also the second mirror unit 711 including the mirrors 705 and 706 at velocity V/2. In this manner, the entire surface of the document 702 is scanned.

The image sensing element 708 comprises a solidstate image sensing element (CCD: Charge Coupled Device) and the like, photoelectrically converts an image formed by the optical system 707 into an electrical image signal, and supplies the image signal to the image processing circuit 712.

The image processing circuit 712 executes a predetermined process for the image signal from the image sensing element 708, and outputs the processed signal as a print signal. In this case, whether or not the document 702 includes a specific image is discriminated by the aforementioned method, and a process according to the discrimination result is done. When the document 702 includes a specific image, no print signal is output, or a modified print signal is output.

The semiconductor lasers 713 to 716 are driven by the print signal output from the image processing circuit 712, and laser beams emitted by the semiconductor lasers 713 to 716 form latent images on the surfaces of the photosensitive drums 725 to 728 by the polygonal mirrors 717 to 720.

The developers 721 to 724 develop the latent images formed on the surface of the photosensitive drums 725 to 728 with K, Y, C, and M toners, respectively.

At this time, a paper sheet fed from one of the paper cassettes 729 to 731 and manual insert tray 732 is chucked on the transfer belt 734 via the registration rollers 733, and is conveyed.

In synchronism with that paper feed timing, color toner images on the photosensitive drums 725 to 728 are developed in advance, and are transferred onto the paper sheet as the paper sheet is conveyed.

The paper sheet on which the color toner images have been transferred is separated from the transfer belt 734, and the toner images are fixed on the paper sheet by the fixing device 735. Then, the paper sheet is exhausted onto the exhaust tray 736.

As described above, when the present invention is applied to the color copying machine 700, if the set document 702 includes a specific image, no image is printed on the paper sheet or a processed image is printed.

Hence, the color copying machine 700 which can reliably prevent forgery can be provided. As in the first embodiment, the discrimination modes shown in FIGS. 6A to 6D can be selected from a control panel of the copying machine.

Third Embodiment

An information processing apparatus 800 shown in FIG. 8 will be explained as the third embodiment of an image input/output apparatus according to the present invention. In the first embodiment, the present invention is applied to the image input/output processing apparatus 100 to which an external printer and storage devices are connected. On the other hand, in this embodiment, the present invention is applied to the information processing apparatus 800.

Figure 8:
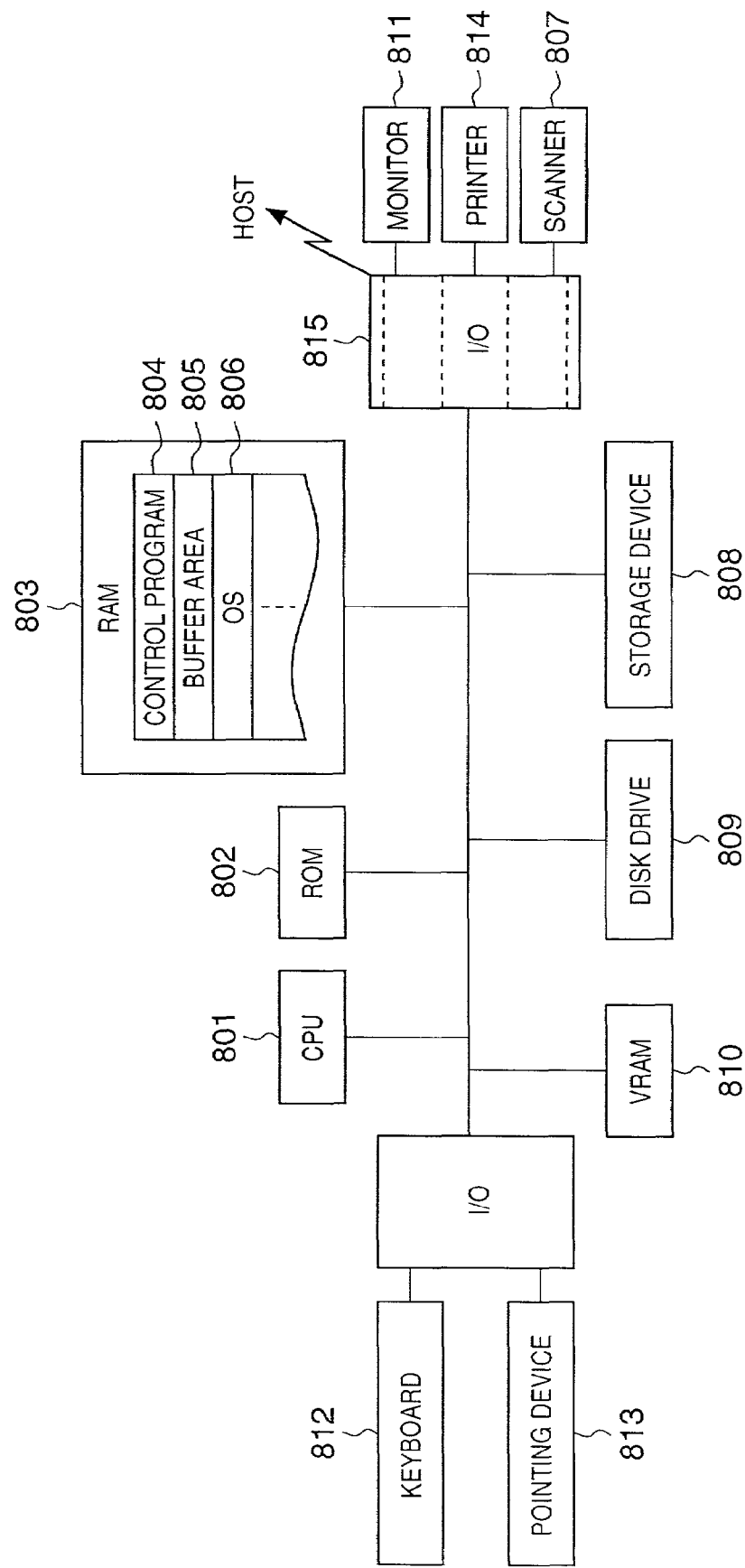
FIG. 8 is a block diagram showing the arrangement of an information processing apparatus according to the third embodiment of the present invention.

In the information processing apparatus 800, as shown in FIG. 8, a CPU 801, ROM 802, RAM 803, image scanner 807, storage device 808, disk drive 809, VRAM 810, monitor 811, keyboard 812, pointing device 813, printer 814, and network circuit 815 are connected via a bus 816 and exchange data with each other.

This information processing apparatus 800 has the functions of the aforementioned image input/output processing apparatus 100 (FIG. 1). The CPU 801 controls the operation of the overall information processing apparatus 800. The CPU 801 corresponds to the input/output control circuit 107, discrimination circuit 111, system control circuit 112, and the like shown in FIG. 1.

The ROM 802 pre-stores a boot program, BIOS (Basic Input/Output System), and the like.

The RAM 803 is used as a work area of the CPU 801, and a buffer area 805 used upon capturing and printing an image, an operating system (OS) 806 for controlling the operation of the overall information processing apparatus 800 as well as a control program 804 corresponding to process procedures are mapped or assured on the RAM 803. When the CPU 801 executes the control program 804 (e.g., the control program shown in FIG. 2 or the like) mapped on the RAM 803, the operation of the overall information processing apparatus 800 is controlled.

The image scanner 807 corresponds to the scanner circuit 101 shown in FIG. 1, and reads an image.

The storage unit 808 is a large-capacity storage device such as a hard disk drive, magnetooptical disk drive, or the like, and corresponds to the storage device 110 shown in FIG. 1. The storage device 808 pre-stores the OS 806 and the like.

The disk drive 809 reads out data from a portable storage medium (e.g., a floppy disk). One of the floppy disk set in this disk drive 809 and the storage device 808 pre-stores the aforementioned control program 804, is read out by the CPU 801, and is mapped onto the RAM 803.

The VRAM 810 rasterizes a bitmap image to be displayed on the screen, and the monitor 811 displays the bitmap image rasterized on the VRAM 810.

The keyboard 812 is used to input various kinds of information, and the pointing device 813 is used to designate a desired position on the display screen of the monitor 811 and to select a desired menu from various menus such as menu dialogs and the like. The CPU 801 controls the operation of the overall information processing apparatus 800 also in accordance with the inputs from the keyboard 812 and pointing device 813.

As in the first embodiment, the discrimination modes shown in FIGS. 6A to 6D can be selected using the keyboard 812 and pointing device 813.

The printer 814 corresponds to the printer device 102 shown in FIG. 1, and prints out an image read by the image scanner 807 and the like.

The interface (network) circuit 815 corresponds to the interface circuit 105 shown in FIG. 1, and connects this apparatus to another host via a LAN or the like. For example, PDL data transferred from the other host can be rasterized to a bitmap image by a software process of the CPU 801.

As described above, since the present invention is applied to the versatile information processing apparatus 800, when an image read by the image scanner 807 or an image transferred via the interface circuit 815 is to be printed out by the printer 814, if that image is a specific image, the image is not printed out or an image that has been modified is printed out. Therefore, the information processing apparatus 800 that can reliably prevent forgery can be provided.

Another Embodiment

The present invention may be applied to either a data processing method in an apparatus consisting of a single device shown in FIGS. 1, 7, and 8, or a system constructed by a plurality of devices.

The objects of the present invention are also achieved by supplying a storage medium, which records a program code of a software program that can implement the functions of the host and terminal of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a ROM, floppy disk, hard disk, optical disk, magnetooptical disk, CD-ROM, CD-R, magnetic tape, non-volatile memory card, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

According to the present invention, an image processing apparatus and method which can reliably and quickly prevent forgery can be provided.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   discrimination means for discriminating, by using any one of a plurality of different discrimination processes including a digital watermark detection process, whether or not image data is a specific image;
   selection means for selecting at least one of the plurality of different discrimination processes based on an operation by a supervisor who inputs a password;
   setting means for setting an order of the plurality of different discrimination processes selected by the selection means when the selection means selects more than one of the plurality of different discrimination processes based on the operation by the supervisor; and
   control means for causing said discrimination means to discriminate using, in the set order, one or more of the discrimination processes selected by said selection means and controlling a process of the image data in accordance with a discrimination result of said discrimination means.

2. The apparatus according to claim 1, wherein said discrimination means executes at least a discrimination process for discriminating similarity between a feature obtained from the image data, and a feature of a specific image which is set in advance.

3. The apparatus according to claim 1, wherein when it is determined in at least one of the plurality of different discrimination processes that an input image is a specific image, said discrimination means aborts other discrimination processes.

4. The apparatus according to claim 1, wherein only when it is determined in a first discrimination process of the plurality of different discrimination processes that an input image is a specific image, said discrimination means executes a second discrimination process.

5. The apparatus according to claim 1, wherein when image data inputted by input means is a specific image, said control means executes one of control for inhibiting the image data from being stored in storage means, control for modifying the image data and storing the modified image data in the storage means, control for erasing the image data temporarily stored in the storage means, and control for modifying the image data temporarily stored in the storage means and re-storing the modified image data in the storage means.

6. An image processing method comprising:
   a discrimination step of discriminating, by using any one of a plurality of different discrimination processes including a digital watermark detection process, whether or not image data is a specific image;
   a selection step of selecting at least one of the plurality of different discrimination processes based on an operation by a supervisor who inputs a password;
   a setting step of setting an order of the selected discrimination processes based on the operation by the supervisor when more than one of the plurality of different discrimination processes are selected in said selection step; and
   a control step of causing said discrimination step to discriminate using one or more selected discrimination processes in the set order and controlling a process of the image data in accordance with a discrimination result of the discrimination step.

7. A computer readable memory that stores an image processing program which can process a specific image,
   said image processing program including:
   a program code of a discrimination step of discriminating, by using any one of a plurality of different discrimination processes including a digital watermark detection process, whether or not image data is a specific image;
   a program code of a selection step of selecting at least one of the plurality of different discrimination processes based on an operation by a supervisor who inputs a password;
   a program code of a setting step of setting an order of the selected discrimination processes based on the operation by the supervisor when more than one of the plurality of different discrimination processes are selected in said selection step; and
   a program code of a control step of causing said discrimination step to discriminate using one or more selected discrimination processes in the set order and controlling a process of the image data in accordance with a discrimination result of said discrimination step.

* * * * *

UNITED STATES PATENT AND TRADEMARK OFFICE
CERTIFICATE OF CORRECTION

PATENT NO. : 7,130,086 B2
APPLICATION NO. : 09/768329
DATED : October 31, 2006
INVENTOR(S) : Eiji Ohara It is certified that error appears in the above-identified patent and that said Letters Patent is hereby corrected as shown below:

Col. 5, Line 15, "are" should read --is--.

Col. 9, Line 64, "circuit" should read --circuit 111.--.

Signed and Sealed this

Twenty-sixth Day of June, 2007

JON W. DUDAS
*Director of the United States Patent and Trademark Office*